United States Patent
Abu-Amara et al.

(10) Patent No.: US 6,317,584 B1
(45) Date of Patent: Nov. 13, 2001

(54) CONTROLLING COMMUNICATION IN WIRELESS AND SATELLITE NETWORKS

(75) Inventors: Hosame Abu-Amara, Richardson; Jeff Babbitt, Plano; Robert Best, Richardson; Giridhar Boray, Plano; Wing Lo, Plano; Payam Maveddat, Plano; Yi Qian, Plano, all of TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/218,130

(22) Filed: Dec. 21, 1998

(51) Int. Cl.[7] .................................................... H04B 7/185
(52) U.S. Cl. ..................... 455/12.1; 455/13.1; 455/411; 455/427; 455/428; 455/435
(58) Field of Search ................................. 455/12.1, 13.1, 455/426, 427, 428, 435, 452, 410, 411; 380/247, 248, 271

(56) References Cited

U.S. PATENT DOCUMENTS

| | | | |
|---|---|---|---|
| 5,490,087 | * 2/1996 | Redden et al. ........................ 455/427 |
| 5,862,475 | * 1/1999 | Zicker et al. ........................ 455/419 |
| 5,913,164 | * 6/1999 | Pawa et al. ........................ 455/427 |
| 5,991,389 | * 11/1999 | Ram et al. ........................ 379/230 |
| 6,112,087 | * 8/1998 | Tayloe ................................. 455/427 |
| 6,134,434 | * 10/2000 | Krishnamurthi et al. ........... 455/419 |

* cited by examiner

*Primary Examiner*—Nay Maung
*Assistant Examiner*—Lewis G. West
(74) *Attorney, Agent, or Firm*—John D. Crane; Bracewell & Patterson, L.L.P.

(57) ABSTRACT

A method and system are disclosed for utilizing a session processor having multiple internal states to control communication sessions occurring within a wireless and satellite network that includes at least one control interface. First, a message is received from the control interface and is then processed. Next, an internal state of the session processor is changed such that a response message may be formulated. Thereafter, internal tables and counters are updated in response to the message. Finally, the response message is delivered to the control interface, such that the session processor may be utilized to maintain comprehensive and seamless control of communications sessions occurring within the wireless and satellite network.

23 Claims, 5 Drawing Sheets

CONTROLLING COMMUNICATION IN WIRELESS AND SATELLITE NETWORKS

BACKGROUND OF THE INVENTION

1. Technical Field

The present invention relates in general to a method and system for permitting rapid implementation of new services within communications systems. In particular, the present invention relates to a method and system for taking direct advantage of new technological advances in network design and traffic transport. More particularly, the present invention relates to a method and system for allowing independence of session processing from the RF technology utilized in the wireless or satellite system, thus maximizing the re-use of session processing functionality, software, and hardware in diverse wireless and satellite networks. Still more particularly, the present invention relates to a method and system for partitioning the functions of RF channel assignment, session admission control, authentication, subscriber profile management, fast message services, billing operations, and OAM (Operations, Administration and Maintenance), thus simplifying the design of each function and maximizing the re-use of existing components, thereby allowing network operators to control session admission, session setup and release, the type and number of sessions that concurrently exist, and the quality of service for the sessions.

2. Description of the Related Art

Factors driving the need for wireless and satellite communications arise from changing user needs and demands. Previously, public network needs were driven primarily by voice data telephony. Wireless and satellite communications are sometimes referred to as multiple access communications systems, reflecting the fact that they involve multiple communications terminals that share the same communication medium. Multiple access communications systems are distinguished from so-called "point-to-point" communications which are found in terrestrial telephone networks in which physically separate communications links are utilized.

Data traffic has grown slowly until recently. With the lower cost in telecommunications and increase in processing power of computers, the number of users accessing wireless and satellite communications networks has increased. The needs of these users include, for example, video telephone, low cost video conferencing, imaging, high definition television (HDTV), and other applications requiring multimedia data transfers. Multimedia combines different forms of media in the communication of information between a user and a data processing system, such as a personal computer. A multimedia application is an application that utilizes different forms of communications within a single application. Multimedia applications may, for example, communicate data to a user on a computer via audio, text, and video simultaneously. Such multimedia applications are usually bit intensive, real time, and very demanding on communications networks.

A multiple access communications system is comprised of a set of transmission and reception devices that include individual communications terminals, such as a personal computer or gateways which act as communications hubs for multiple terminals. A communications session is initiated when a communications request is delivered from an originating terminal to some form of Network Control Center (NCC). In a satellite communications system, a connection request is first delivered to a transceiver aboard a satellite. Thereafter, the satellite then relays the connection request message to the NCC which is comprised of the various control devices and entities that must process the request before the connection will be permitted to proceed.

Before the NCC will authorize the satellite to perform the requested connection, the control devices and entities, referred to hereinafter as control interfaces must perform various functions such as user authentication, billing updates, RF channel allocation and updates, etc. As previously discussed, multimedia communications within a multiple access communications system is enormously complex and the control functions required to setup and monitor such communications is likewise multifaceted and complex.

As an example, an NCC may include several distinct devices responsible for different control functions. For simplicity of explanation, these devices will be referred to hereinafter as "control interfaces". Currently an NCC utilized in a multiple access communications system may employ many different control interfaces that individually perform particular control functions such as those involved in communication setup or in monitoring a parameter, such as channel quality, after the communication link has been established. These control functions are often handled as discrete functions and are therefore performed entirely separately without adequate interfacing to permit efficient, orderly and reliable control administration.

The sheer complexity and the substantial potential for confusion resulting in errors are an inherent problem involved in controlling such communications sessions. One example of such an error occurs when an authentic but financially defaulted telecommunications account is erroneously permitted to place a long-distance call. Many other such examples are possible.

Based on the foregoing, it can be appreciated that a need exists for a method and system for issuing the necessary instructions to and from communications control interfaces. Such a method and system may be utilized for coordinating activities among the various network devices in wireless and satellite communications networks. Among the advantages of implementing such a method and system is that such a technique would prevent a communications control center (located on a satellite, for example) from receiving conflicting control messages. Such a method and system would thus increase the efficiency and reliability of the control phase of wireless and satellite communications systems. Such a method and system, if implemented, would also be useful to control and regulate network traffic congestion while maintaining Quality of Service (QoS) guarantees for users of such wireless and satellite communications networks.

SUMMARY OF THE INVENTION

It is therefore an object of the invention to provide a method and system for permitting rapid implementation of new services within communications systems.

It is another object of the invention to provide a method and system for taking direct advantage of new technological advances in network design and traffic transport.

It is still another object of the invention to provide a method and system for allowing independence of session processing from the RF technology utilized in the wireless or satellite system, thus maximizing the re-use of session processing functionality, software, and hardware in diverse wireless and satellite networks.

It is yet another object of the invention to provide a method and system for partitioning the functions of RF channel assignment, session admission control, authentication, subscriber profile management, fast message services, billing operations, and OAM (Operations, Administration and Maintenance), thus simplifying the design of each function and maximizing the re-use of existing components, thereby allowing network operators to control session admission, session setup and release, the type and number of sessions that concurrently exist, and the quality of service for the sessions.

The above and other objects are achieved as is now described. A method and system are disclosed for utilizing a session processor having multiple internal states to control communication sessions occurring within a wireless and satellite network that includes at least one control interface. First, a message is received from the control interface and is then processed. Next, an internal state of the session processor is changed such that a response message may be formulated. Thereafter, internal tables and counters are updated in response to the message. Finally, the response message is delivered to the control interface, such that the session processor may be utilized to maintain comprehensive and seamless control of communications sessions occurring within the wireless and satellite network.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

Figure 1:
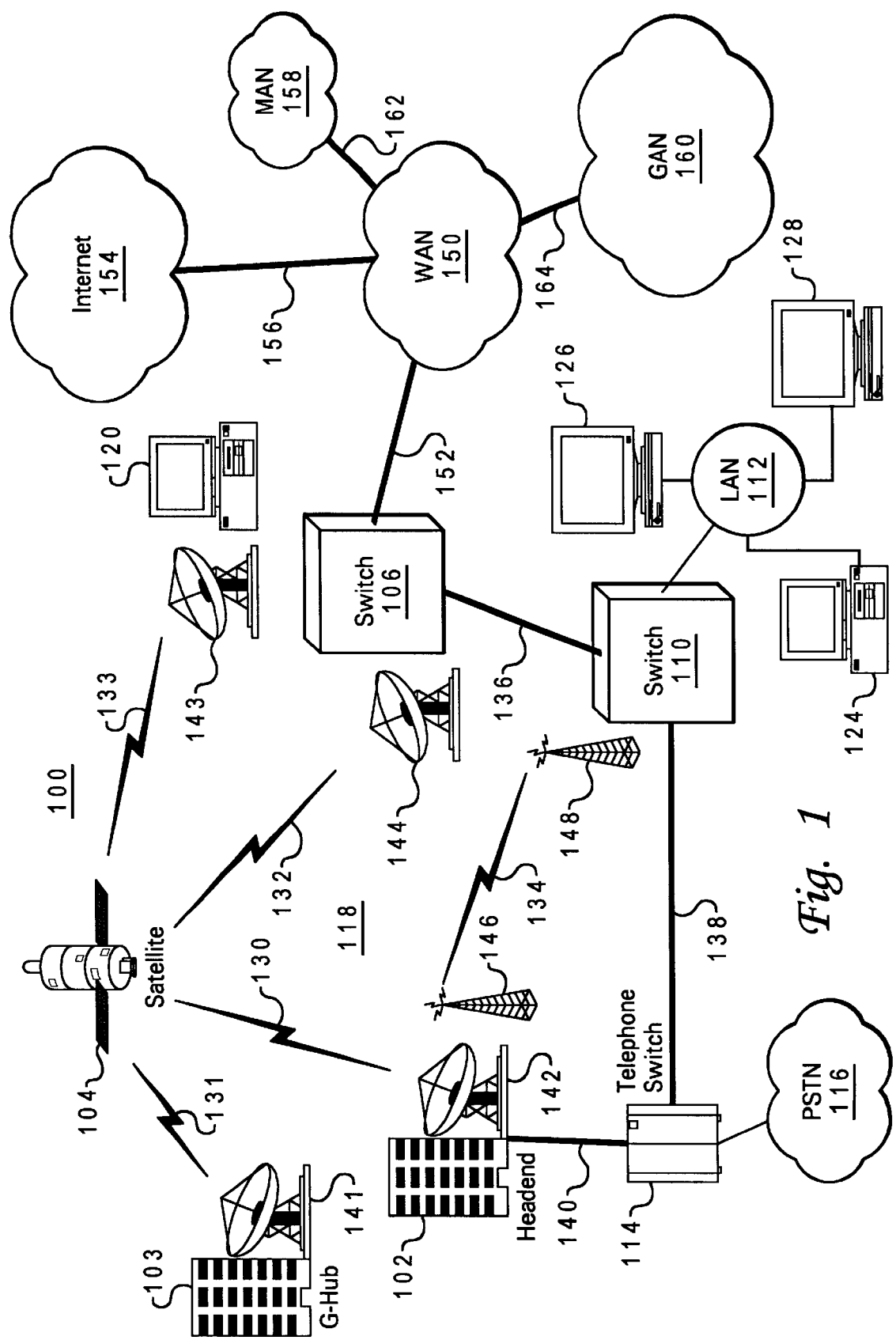
FIG. 1 depicts a diagram of a multimedia communications system in accordance with the teachings of the present invention.

DESCRIPTION OF PREFERRED EMBODIMENT
Session Processing

The term "session processing", as utilized herein, refers to the software and hardware resources required to establish calls, connections, or transactions and provide services to subscribers. In its simplest form, a connection can be a file transfer protocol (FTP) connection between two parties, where the originator of the connection wishes to store data in or retrieve data from the destination of the connection. The simple connection, or call, can be enhanced with communication control services. For example, the orderly administration and coordination of control functions associated with a session may be necessary to permit efficient and reliable 3-way connections that allow another party to join the connection for a multi-cast video-conference. The control message flow depicted in FIG. 3 and the flow chart depicted in FIG. 4 illustrate the sequence of messages required for session processing. In addition, session processing may involve digit translation. Digit Translation is the process of routing sessions based on the number dialed by the source user.

An entity commonly known as a Network Control Center (NCC) may be utilized as a centralized representation of various control devices associated with a wireless or satellite communications network. An entity referred to hereinafter as a generic hub or G-Hub, is now defined to include the entities included within a typical NCC with the addition of a switching system. Such a G-Hub is depicted in FIG. 1 as G-Hub 103 and again in FIG. 2 as G-Hub 220. Paging Management A session processor (SP) keeps track of the current location of the users, the addresses of customer premises equipment (CPE) to which these users are connected, the status of the users (idle, engaged in a session), and the length of time since the last paging update. Depending on the length of time since the last paging update, the SP may perform a variety of actions such as sending a query to the CPE or user or disconnect the user.

Sessions in wireless and satellite systems go through at least three phases: session setup, conversation, and session release. During session setup, several operations need to be performed. For example, RF channels need to be assigned, users are authenticated, routes may be created, call admission control operations may be performed, user profiles are checked, and billing records are created (call admission control is a label used interchangeably with session admission control and for consistency the label "Connection Admission Control" or "CAC" will be utilized in reference to either in the following discussion). During conversation, information traffic is carried between the source and destination of the session. In addition, switching operations and buffering may be performed during the conversation phase. During session release, various resources associated with the session are released (reserved RF resources or buffers may be release, for example). Throughout these session phases, many OAM operations may be performed, such as the establishment of session records, assessment of quality of service values, and creation of session logs. As utilized in the following explanation, the phrase "session control phase" will include those processes within each of the three session phases that involve control functions as opposed to the data transmission between users of a communications system.

In accordance with the teachings of the present invention, a Session Processor (SP) is provided which performs the following functions in a wireless or satellite communications system: system start-up and reloading; software downloading and internal software distribution; connection, call, and transaction processing; and interfacing with RF resource management, session admission control, authentication, subscriber profile management, fast message services, billing operations, and OAM (Operations, Administration & Maintenance) functions. Thus, the SP is responsible for the session setup and release phases, and parts of the OAM operations. Depending on the wireless or satellite system design, the SP may also be responsible for some parts of the session conversation phase while a switching system may be responsible for the remaining parts of the session conversation phase.

In accordance with the teachings of the present invention, a SP is a functional or logical entity, and its functionality may be centralized or distributed among various network elements. For example, if the SP is utilized in satellite systems where the satellite has no on-board processing, then, in one embodiment of the present invention, the communication control system may be designed to keep all the functionality of the SP on the ground. On the other hand, if the SP is utilized in satellite systems where the satellite has on-board processing, then the control system may be designed such that the functionality of the SP is partitioned into portions which are implemented on-board the satellite and portions which are implemented on the ground. Hence, the method and system of the present invention includes embodiments in which the SP acts as a "glue" between various network devices and elements.

In the following description, a transport stream is defined to be a bit carriage technology such as ATM, Frame Relay, or dedicated circuits that transfer information between two entities. The design and functionality of the SP in accordance with the teachings of the present invention is described below in greater detail.

SP Table Control

In accordance with the teachings of the present invention, an important feature of session processing is a control feature that will be referred to hereinafter as "table control". Table control is the collection of software, hardware, and commands utilized to enter, display, and change configuration databases. These databases are referred to as "tables" when they exist in the SP. In one embodiment of the present invention, these tables may include: a Session Table, an Outstanding Message Table, an Address Binding Table, a Physical Binding Tables, a CPE Status Table and a Paging Table.

Session Table

The SP may create and maintain a table that includes for each connection, call, or transaction: Source address, Destination address, Request ID, Type (Continuous Bit Rate (CBR), Variable Bit Rate (VBR), fast message, for example), Authentication status, Billing status, and Activity status (e.g. attempting origination, active, attempting release). A "Request ID" is assigned to every message that is sent out of the SP to other functions or devices. This "Request ID" is generally sent back to the SP as a part of the response from the other function or device. The Request ID is utilized by the SP to correlate the response from the function or device to the request sent to that function or device. Request IDs are sometimes referred to as "identification tags".

Outstanding Message Table

The SP may create and maintain a table that specifies messages that have been sent recently but for which no responses were received and that specifies what messages are expected as responses. The SP utilizes Request IDs as indices into this table.

Address Binding Table

The SP may also contain a table that specifies the sub-network address for each source and destination address.

In some wireless and satellite architectures, the users are not constrained to a specific terminal. Thus, there are User addresses and Host addresses. The address binding table dynamically maintains the relationships between user and host addresses.

Physical Binding Tables

The SP may contain tables that facilitate communication to user CPEs (Customer Premises Equipment), e.g. a table for digit translation operations. In the various possible applications there may be multiple types of addresses assigned to each source and destination address. For instance, these types of addresses may include, but not limited to: IP addresses and ATM addresses. In many cases it may be required to convert the physical address to one of the other addresses. This function is called digit translation.

CPE Status Table:

The SP may contain a table that specifies, for each CPE, the status for the CPE (e.g. active, idle, off-line) and the addresses of the users that currently utilize the CPE.

Paging Table

The SP may contain a table that specifies the current location of the users, the addresses of the CPEs to which these users are connected, the status of the users (idle, engaged in a session), and the length of time since the last paging update.

Recall that, as disclosed in the description of the present invention, a SP maintains and updates multiple internal states. A preferred embodiment of the present invention is therefore a session processor having multiple internal states to control communication sessions occurring within a wireless and satellite network that includes at least one control interface. First, a message is received from the control interface and is then processed. Next, an internal state of the session processor is changed such that a response message may be formulated. Finally, the response message is delivered to the control interface, such that the session processor may be utilized to maintain comprehensive and seamless control of communications sessions occurring within the wireless and satellite network.

As described below, processing a message in the SP is defined as:

(1) The assignment of unique and unutilized Request IDs to each user session and the update of the various tables, including those discussed above, or (2) keeping, incrementing or clearing counters that the SP may utilize, such as those maintaining the number of Authentication attempts for each Request ID or user address.

reference now to the figures, and in particular with reference to FIG. 1, a diagram of a communications system 100 is depicted upon which the present invention may be implemented. In particular, the present invention may be implemented as a control entity within the various switches depicted in communication system 100. Headend 102; Generic Hub (G-Hub) 103; satellite switch 104; switch 106, which is a terrestrial switch connected to wide area network (WAN) 150; switch 110 connected to LAN 112; and telephone switch 114 connected to public switch telephone network (PSTN) 116 form a wide area network (WAN) 118. LAN 112 also includes computers 124, 126, and 128. Users of these computers may send information to and from each other or to other users (not shown) within WAN 118 via communications links 130, 132, 134, 136, 138, and 140.

Communications link 130 is a radio frequency based link in which the data signal is transmitted from satellite dish 142 at headend 102 to satellite switch 104. Similarly, communications link 131 is an RF based link utilized for transmission from satellite dish 141 at G-Hub 103 to satellite switch 104. Communications link 132 is a radio frequency based link, generated by signals sent from satellite switch 104 to satellite dish 144, which is associated with switch 106. In this manner, data signals, such as multimedia data, which may include video, graphics, voice, and text, may be sent from headend 102 to a computer such as computer 126 in LAN 112. Communications link 133 is also a radio frequency based link, generated by signals sent from satellite switch 104 to satellite dish 143, which is associated with a single data processing system 120. In a similar manner, data signals, such as multimedia data, which may include video, graphics, voice, and text, may be sent from headend 102 to a computer such as computer 120. Satellite dish 144 may transmit data signals through communications link 132 to satellite switch 104 and through communications link 130 to satellite dish 142 for reception at headend 102. Similarly, satellite dish 143 may transmit data signals through communications link 133 to satellite switch 104 and through communications link 130 to satellite dish 142 for reception at headend 102.

Communications link 134 is a radio frequency communications link generated between radio tower 146, associated with headend 102 and radio tower 148, associated with switch 110. Switch 106, switch 110, telephone switch 114, and headend 102 are connected to each other via communications links 136, 138, and 140, which may include any of a combination of the following linkage types: coaxial cables, fiber optic cables, a combination of the two, or air interface or satellite links. Each switch has a "link", also called a "path", within the switch for routing data through the switch. An "input link" is the input or source portion of the link associated with an input into the switch, and an "output link" is the output or destination portion of the link associated with an output from the switch.

Data may be sent through a number of different paths using various communications links and switching within WAN 118. For example, a user at computer 124 may send information to a user in public switched telephone network (PSTN) 116 through communications link 138. Alternatively, information may reach the user in PSTN 116 from computer 124 by sending data through a path starting with communications link 136 to communications link 132, to communications link 130, and then to communications link 140 to reach the user within PSTN 116. The various switches in WAN 118 direct traffic between other switches to facilitate flow of information within this network. Although the depicted examples show data transfers between computers, data also may be transferred between other communication devices (not shown) within communications system 100.

WAN 118 is connected to other networks, such as WAN 150 through a communications link 152 connected to switch 106. A WAN is typically designed to interconnect computer systems over large geographic areas, such as from one city to another city within a country. Typically, a WAN may range from 100 to 1000 kilometers and the data transfer speed between the cities can range from 1.5 Mpbs to 2.4 Gpbs. Communications system 100 also includes a connection from WAN 150 to internet 154 through communications link 156. Additionally, other types of networks such as metropolitan area network (MAN) 158 and global area network (GAN) 160, and connected to WAN 150 through communications links 162 and 164, respectively. Metropolitan area networks typically cover a metropolitan city and interconnects a number of different LANs located in different buildings. A global area network provides connections between countries around the globe. An example of such a network is internet 154. Data is transferred to and from these various networks and to communications systems and devices within the networks using switches, such as those depicted for WAN 118.

Communications link 131 is also a radio frequency based link, generated by signals sent from satellite switch 104 to satellite dish 141, which is associated with G-Hub 103. In one embodiment of the present invention, a session processing method and system may be implemented in a G-Hub, such as G-Hub 103. Those skilled in the art will appreciate that the functionality contained within G-Hub 103 may easily be implemented as part of Headend 102. The present invention also may be implemented in a distributed manner in which physical or logical entities involved in implementing session processing are divided between network devices such as satellite switch 104 and G-Hub 103.

Control and coordination of data transmissions within WAN 118 described above is handled at G-Hub 103. G-Hub 103 typically includes multiple control interfaces (not depicted in FIG. 1) that will be described in further detail in association with the description of a Session Processor (SP) in FIG. 2.

Figure 2:
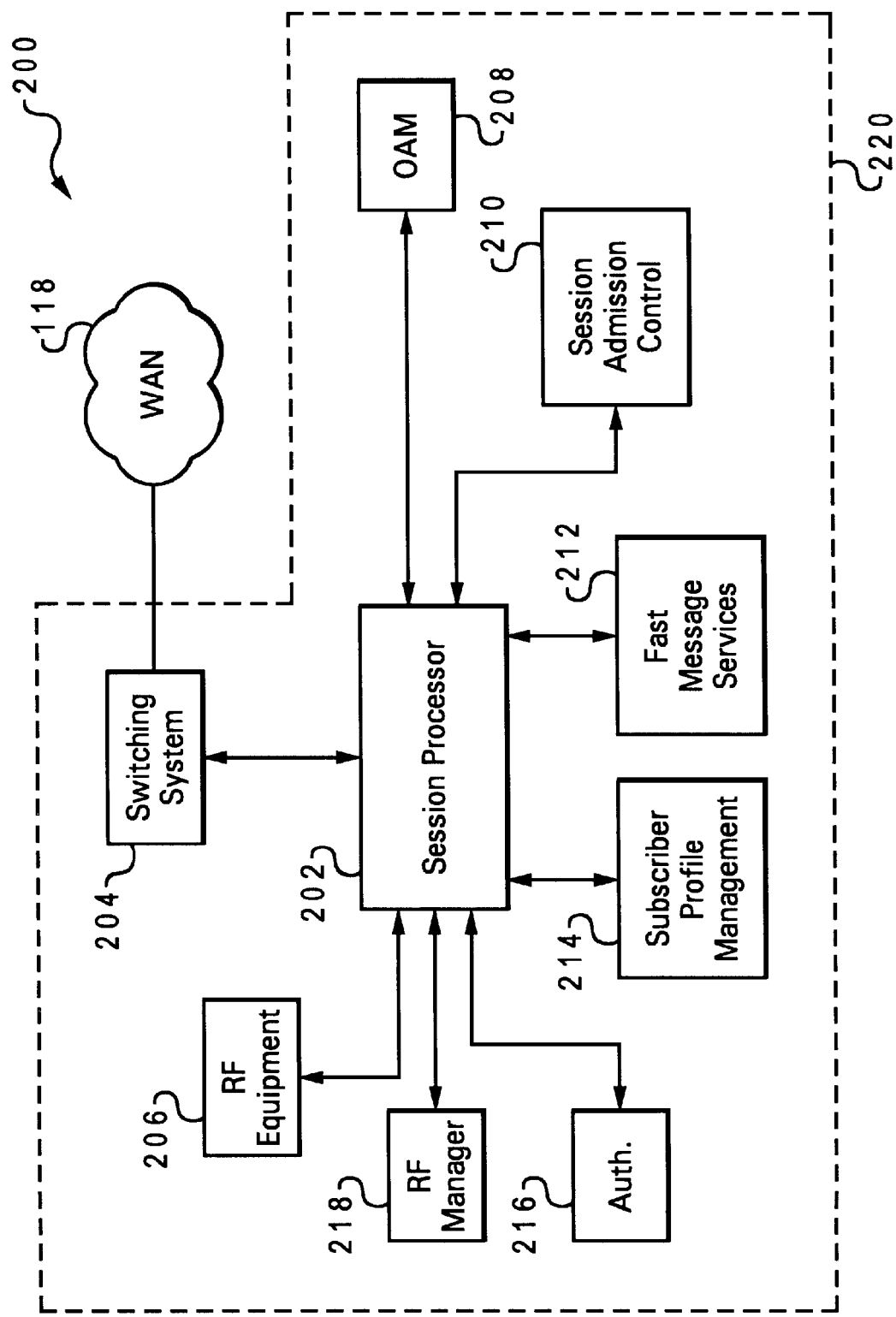
FIG. 2 is a block diagram illustrating functional entities utilized in a wireless or satellite communications system that may be utilized in a preferred embodiment of the present invention.

In a typical implementation, a Session Processor (SP) will be collocated with a switching system, an RF manager, a subscriber profile manager, and a session admission control, among other control interfaces, at the point where the wireless or satellite system interconnects with external networks. For clarity of explanation, this point of interconnection will be referred to in the following description as a generic hub or "G-Hub". With reference now to FIG. 2, a block diagram of a communications system 200 is depicted. Communications system 200 is comprised of functional entities depicted in FIG. 1 and like elements will remain consistently numbered. As illustrated in FIG. 2, communications system 200 includes a generic hub 220, referred to hereinafter as G-Hub 220 that is connected to WAN 118.

As depicted in FIG. 2, G-Hub 220 is comprised of the following: a switching system 204; RF equipment 206; an RF manager 218; an authentication module 216; a subscriber profile manager 214; a fast message service 212; a session admission control 210; an Operations, Administration, and Maintenance (OAM hereinafter) module 208; and SP 202. Although session processor 202 is depicted within communications system 200 as a single block, those skilled in the art will appreciate that session processor 202 may be physically implemented in either a centralized or a distributed design. For example, session processor 202 may be implemented in part or in its entirety as part of satellite 102 of FIG. 1. Those skilled in the art will further appreciate that the composition of G-Hub 220 as comprising a limited number of particular control interfaces, as depicted in FIG. 2, is only one of many possible configurations in which a session processor is utilized to coordinate a communications session. Therefore, any device or entity that is involved in controlling communications within a wireless or satellite communications network may also be included within G-Hub 220 and interface with SP 202 in alternate embodiments of the present invention.

The manner in which SP 202 interfaces with other component entities of G-Hub 220 will now be described. SP 202 utilizes these interfaces to perform the following communications control functions: (1) respond to messages it receives and send the appropriate message to the proper device (A flow chart of this process is presented in FIG. 4); (2) assign unique and unutilized Request IDs to each session and update the Outstanding Message Table; (3) keep, increment and clear counters for the number of authorization attempts for each session; (4) package data and information into messages with appropriate format and utilize addresses contained in an Address Binding Table to send the messages to destination subnetworks; (5) extract data and information from messages originating from source subnetworks; (6) access user-specific profiles for each user to determine the services that the user is allowed to access; and (7) update various tables such as the tables discussed above.

As a functional or logical entity SP 202 may include multiple internal states similar to those contained within a computer processor. Therefore, in order to perform or coordinate the above mentioned control functions, an internal state of SP 202 may be changed in response to receiving and processing a message from a control interface.

A. Operation, Administration and Maintenance (OAM) Interface

All manual OAM operations in the wireless or satellite system are expected to be invoked by utilizing SP 202. SP 202 translates manual OAM operations into requests that the SP sends to OAM components represented in FIG. 2 as an OAM module 208. OAM module 208 performs several logistical functions including providing support for billing services, maintaining SP logs, monitoring operational measurements (OM), and providing system alarms.

1. Billing Services

The billing services provide the accounting of resource utilization and session timings. SP 202 permits OAM 208 to create a Session Detail Record (SDR) that is generated for each session attempt which captures all relevant data pertaining to the session to assist the service provider to process the collected information. SP 202 then forwards these SDRs to the service providers'equipment. In addition, SP 202 utilizes its interface with OAM 208 to query the service provider as to the status of a particular user's account, e.g. to determine whether the user is delinquent.

2. SP Logs

OAM module 208 may also be utilized to maintain SP logs and, in one embodiment of the present invention, a logs subsystem is created. A logs subsystem (not depicted) on SP 202 is utilized to record detailed information about events that occur in the system. Such events include device status changes (manually invoked or detected/caused by the system), session processing treatments applied, connectivity problems, error conditions or problems found at run time, audit results and corrective actions taken, etc. These logs can be directed to screens, printers, or files. SP 202 then forwards these logs to OAM equipment such as OAM module 208.

3. SP Operational Measurements (OM)

Operational measurements (OMs) may be included among the functions of OAM module 208. OMs provide a means for tracking events or occurrences throughout a system. Examples of OMs are session originations, channel allocations, load balancing, session durations, types of sessions, and maintenance transitions. SP 202 may act as the collection point for storage and retrieval of OMs. In general, some OMs are generated in SP 202. However, some occurrences are not possible to track in SP 202 and as such, these OMs are generated in peripherals and polled by SP 202. SP 202 then forwards these OMs to OAM equipment such as OAM module 208.

4. Alarms

Alarms are utilized throughout the system to flag events or problems occurring in the hardware or software. In one embodiment of the present invention, SP 202 may interface with OAM module 208 and act as the collection point for storage and retrieval of alarms. SP 202 then forwards these alarms to OAM equipment such as OAM module 208.

B. RF Equipment Interface

The RF equipment receives over the air communication, converts that communication into a format that SP 202 understands, and sends the converted information to SP 202. similarly, RF equipment 206 receives communication from its interface with SP 202, converts it into a format suitable for over the air transmission, and sends the converted information over the air. In typical wireless and satellite systems, RF equipment 206 represent precious resources that need to be managed carefully by an RF Resource Manager 218, to be discussed next.

C. RF Resource Management Interface

RF Resource Manager 218 is responsible for generating burst-time plans, i.e. the assignment of time slots on specific frequencies to each user. SP 202 utilizes its interface with RF Resource Manager 218 to request the assignment of time-frequency time slots to users'data or control messages, or to request the removal of such an assignment. From its interface with RF Resource Manager 218, SP 202 may learn whether a particular session can not be established because of lack of RF resources, or what assignments have been given to a session. Also, SP 202 utilizes its interface with RF Resource Manager 218 to gather information related to the quality of service (QoS) values that the existing sessions experience.

Broadband wireless multimedia networks employ powerful switching systems in G-Hubs to provide a multitude of broadband services with attributes such as bandwidth-on-demand and Quality of Service guarantees. When such services are delivered on wireless links (such as Multiple Access Satellite Systems), the characteristics of the radio channel influence the transmission qualities with broad impact on the Quality of Service guarantees. In a preferred embodiment of the present invention, a Dynamic Radio Channel Quality driven Quality of Service guarantee mechanism is described with recommendations on the methodologies for implementation. For clarity of reference in the following discussion, session Quality of Service metrics are sometimes referred to as quality metrics, and session Quality of Service guarantees are referred to as quality guarantees.

Figure 5:
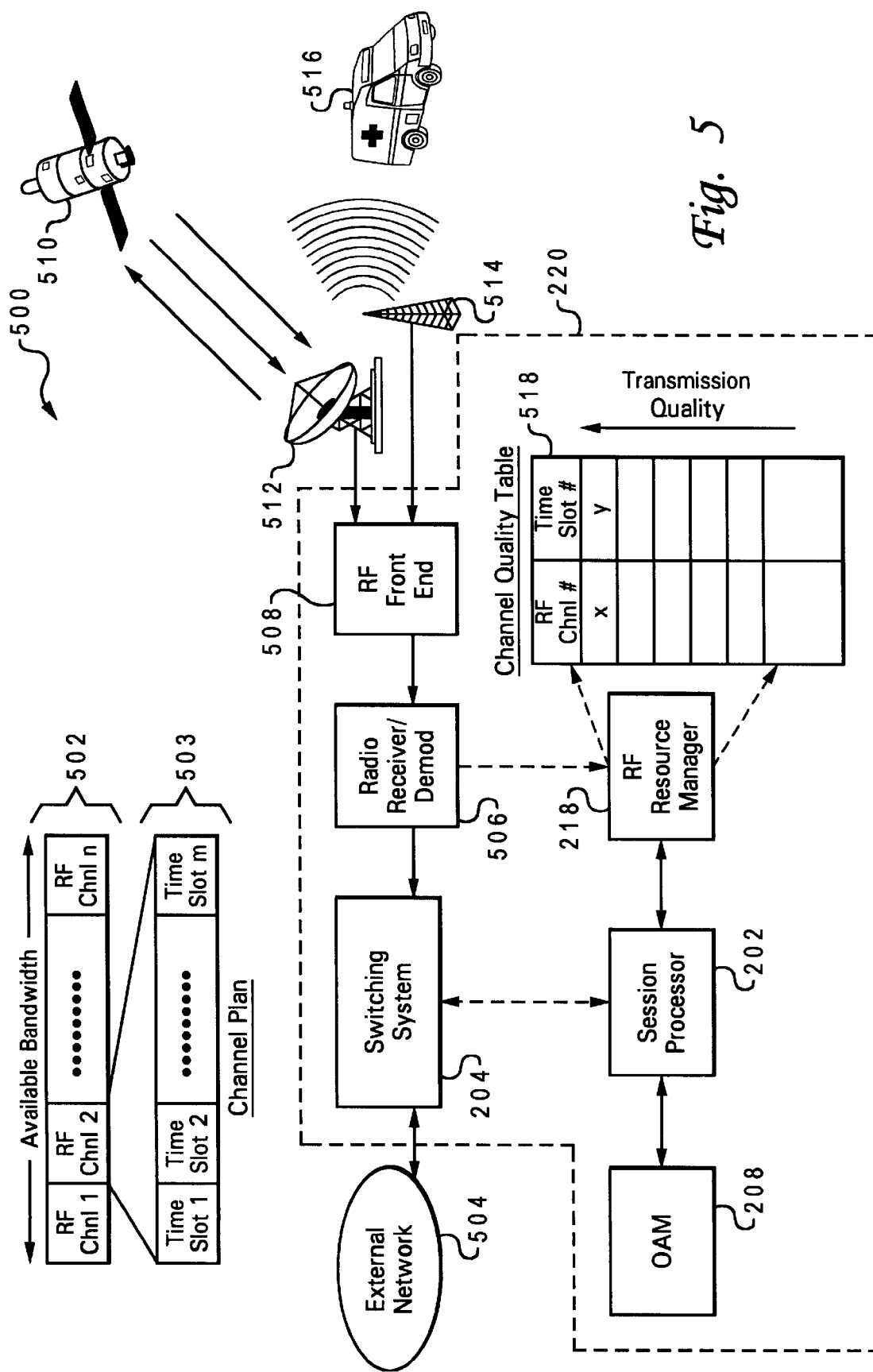
FIG. 5 depicts a design and specification of devices and entities implemented to perform session processing in a wireless and satellite communications network in accordance with the teachings of the present invention.

Turning now to FIG. 5, there is depicted a design and specification of devices and entities implemented to perform session processing in a wireless and satellite communications network 500 in accordance with the teachings of the present invention. FIG. 5 illustrates an example implementation of G-Hub 220 of FIG. 2 in which a Dynamic Radio Channel Quality driven Quality of Service method mechanism is implemented via control interfaces such as RF resource manager 218 that contains a channel quality table 518. As seen in FIG. 5, communications network 500 includes G-Hub 220, a satellite dish 512, a radio tower 514, and an external network 504. In one embodiment of the present invention, external network 504 may be a WAN such as WAN 118 depicted in FIGS. 1 and 2. Together with SP 202, G-Hub 220 includes the control interfaces depicted in FIG. 2 such as RF resource manager 218, OAM 208 and switching system 204. Although the operations RF resource manager 218 and SP 202 are the emphasis of the following description of Quality of Service metrics, it should be noted that the other control interfaces as depicted within G-Hub 220 perform their respective functions as described in the accompanying description of G-Hub 220 in FIG. 2. Note that an ambulance 516 is depicted as a wireless or satellite network user and therefore Quality of Service metrics performed during all session phases is particularly important.

During the following explanation, the Dynamic Radio channel Quality driven Quality of Service method may be referred to as the Quality Method. In typical wireless multimedia systems, users, such as ambulance 516, access the network via radio channels. A band of frequencies is allocated for wireless access and RF resource manager 218, which may reside within a G-Hub manages the allocation of radio resources (frequencies and time slots). The radio frequencies are allocated according to a Time Division Multiple Access or TDMA protocol. TDMA is well understood in the art and is incorporated herein by reference. Segmented blocks 502 and 503 illustrate the division and allocation scheme utilized by RF resource manager 218 in implementing TDMA.

Because of the nature of radio propagation, not all channels and time slots experience the same type and amount of distortion. OAM 208 constantly receives information regarding various Quality of Service metrics. Within the configuration depicted in FIG. 5, OAM 208 may receive information regarding the quality of the graphics channels utilized by ambulance 516. While receiving and ascertaining such channel quality metrics in real-time, OAM relays the resulting processed channel quality information to SP 202. SP 202, while coordinating various other control functions, will process the channel quality information from OAM 208 and deliver the results to RF resource manager 218. By suitable assessment of such measurement mechanisms, RF resource manager 218 will create and dynamically maintain within channel quality table 518, a list of radio resources ordered in accordance with real-time transmission quality. Session processor 520 will request that RF resource manager 218 allocate a radio resource with a specified transmission performance based on the Quality of Service request for a specific service.

There exist several well known techniques for measurement of radio channel quality. Two possible measurement techniques as they relate to broadband multimedia wireless and satellite systems are channel quality measurement (CQM) based on frame maker inserters and extractors, and CQM based on known patterns transmitted by subscribers. Both of these CQM techniques are well known in the art and are incorporated herein by reference.

D. Session Admission Control Interface

Turning back to FIG. 2, one way to control traffic congestion and satisfy users'quality of service (QoS) requests is to implement a Session Admission Control 210, which is a process that determines whether a session should be accepted or rejected. (Many references are available for further reading on this topic. See May 1997 of IEEE Communications Magazine.) SP 202 utilizes its interface with Session Admission Control 210 to determine whether a particular session can be accepted by session switching hardware contained in a switch system 204.

More importantly, SP 202 utilizes its interface with Session Admission Control 210 to gather information regarding the Quality of Service values that the existing sessions experience. SP 202 combines this information with the corresponding information from RF Resource Manager 218 to make a final determination whether to accept or reject a session.

E. Session Switching System Interface

G-Hub 220 may include session switching hardware contained in switching system 204 that is responsible for parts or all of the conversation phase of sessions. SP 202 may utilize its interface with switching system 204 to communicate with other devices, other parts of the wireless or satellite network, or networks owned or operated by various network providers.

Authentication Interface

It is likely that any implementation of communications system 200 will require a user authentication system.

Authentication systems such as authentication system 216 perform fraud prevention. These systems ensure that any user is authorized to utilize communications system 200. Those skilled in the art will appreciate that there are many different types of authentication systems, any of which can be utilized in communications system 200, in accordance with the teachings of the present invention.

Most authentication systems utilize some sort of unique key that is known both to the user equipment and the authentication system itself, and a random number. Upon authentication, the user equipment will perform a mathematical operation utilizing a unique key and a random number. The authentication function performed at authentication system 216 within G-Hub 220 then verifies that result as being correct.

The messages between SP 202 and the authentication system 216 are comprised of authentication requests and responses. Authentication requests from SP 202 initiate the authentication function within authentication system 216 to generate, record and pass a random number to SP 202 to then be sent to the user. A response, containing the result from the user is sent from SP 202 to authentication system 216 where it is verified as correct. If the result is verified as correct, then the user must have the correct unique key and is authorized. If the result is not correct, authorization is denied. The response to SP 202 from authorization system 216 contains approval or denial of an authorization request.

G. Subscriber Profile Management Interface

Subscriber information relevant to the provision of telecommunications services is held in a subscriber profile management component such as subscriber profile manager 214. For example, subscriber profile manager may contain a list of services a particular subscriber is allowed to access, any restrictions on these services (e.g. time of day use), and the number of times the subscriber can access the service. SP 202 utilizes its interface with subscriber profile manager 214 to determine whether to reject session requests from subscribers.

H. Fast Message Services Interface

A Fast Message Service (FMS) server 212 provides a service designed to solicit a very brief response from FMS servers (e.g. validation of a credit card) then terminate the session. In a typical implementation, before beginning a FMS session, a user terminal previews the query data to be sent, to determine the extent of the resources that will be required. This resource requirement is then sent as a parameter in an origination message intended to initiate a FMS session. As part of processing the origination request, SP 202 will query RF Resource Manager 218 to secure frequency and time slot assignments, then SP 202 will secure channel assignments and other resources from the FMS server 212. Information on assigned resources and channel assignments are returned to the user via RF equipment 206. The user then sends a single burst of data through SP 202 to FMS server 212 which in turn responds with the information sought by the user. All associated return channel resources are then released, the response is returned to the user via RF equipment 206, and the session is terminated.

Figure 3:
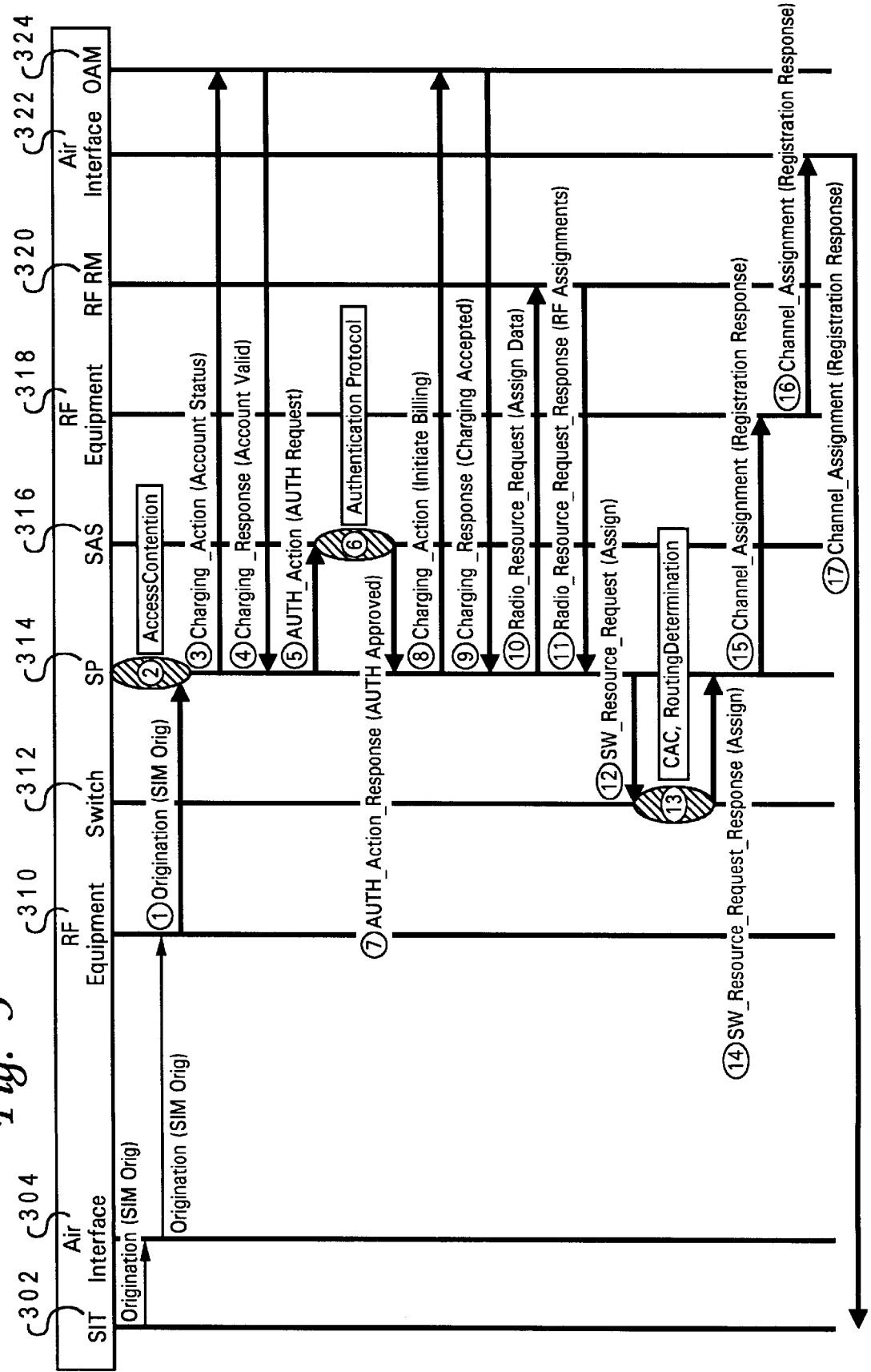
FIG. 3 is a control message flow diagram depicting session processing and paging management in accordance with the teachings of the present invention.
Figure 4:
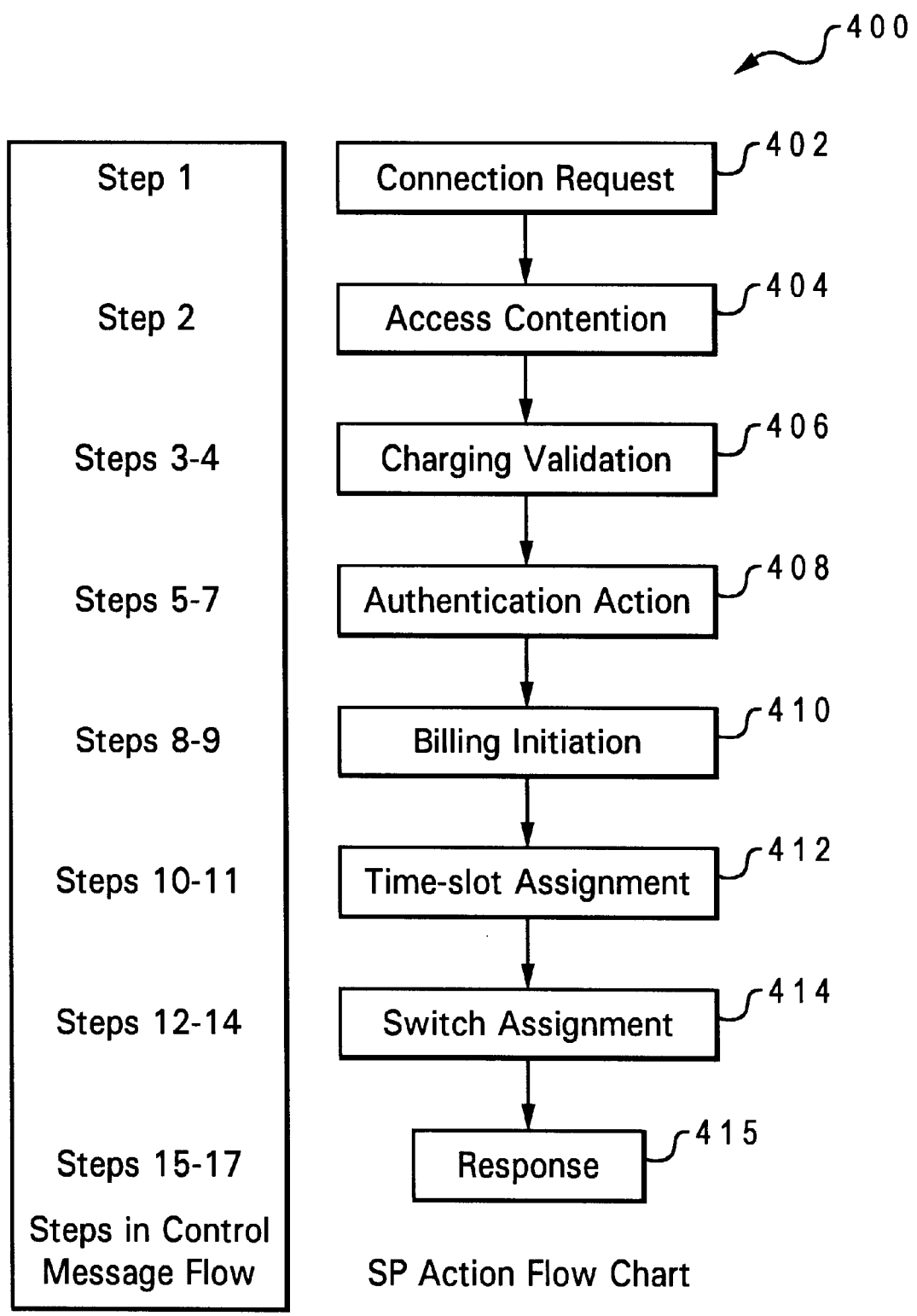
FIG. 4 is a flow chart illustrating a simplified series of steps utilized to perform session processing in accordance with the teachings of the present invention.

FIG. 3 is a control message flow diagram depicting session processing and paging management in accordance with the teachings of the present invention. FIG. 3 illustrates one possible message flow in accordance with the teachings of present invention that may occur when a user attempts to make contact with or "log on" to a communications system. This process was described previously and will continue to be described as session setup. It should be noted, however, that, as described previously, session processing of control messages may also occur during the communications and session release phases of a session. Those skilled in the art will appreciate and understand the extensions necessary to apply the principles demonstrated in FIG. 3 as related to session setup, to the communications and session release phases of a session. An example of the use of session processing during the communications phase of a session is provided in FIG. 5 which illustrates the manner in which a Quality of Service method, implemented in accordance with the teachings of the present invention, ensures reliable data transmission to and from an ambulance. Note also that as utilized herein, the term "originator" is not necessarily synonymous with a human operator. An originator can be a human operator or an electrical device such as a computer. The term "originator" can refer to the devices from which a wireless or satellite communications link originates.

At step 1 there is depicted the origination of a communications link in a satellite or other wireless communications system utilizing a subscriber identification module (SIM). The origination depicted at step 1 begins at subscriber interface terminal (SIT) 302. Next, within step 1 is depicted the transition of a SIM number through an iar interface 304 to RF equipment 310. SIM origination thus proceeds from RF equipment 310 which delivers the SIM number to session processor (SP) 314. It is within SP 314 that, as illustrated in step 2, access contention is performed. Access contention in step 2 may include validating the accounting status of the originator of the communications link at an OAM module 324, as illustrated in step 3. Upon verification of account status of the originator at OAM module 324, a charging response is returned from OAM module 324 to SP 314 as illustrated at step 4. In response to receiving an "account valid" response from OAM module 324, SP 314 responds by sending an authorization action in the form of an authorization request to session administration service (SAS) 316 as depicted at step 5.

SAS 316 administers services such as user authentication and user profile veridication as illustrated at step 6 and may then deliver a response to SP 314 as depicted at step 7. After the originator has been authenticated according to the authentication protocol as shown at step 6, and SP 314 has received and processed such authentication, a charging action to initiate billing is then automatically initiated from SP 314 to OAM module 324 as illustrated at step 8. OAM module 324 returns a response which either accepts or rejects the charges. If the charges are accepted, then, as depicted in step 9, a message is sent from OAM module 324 to SP 314 indicating that SP may then continue to the next control function. In the example control message flow depicted in FIG. 3, the response depicted at step 9 from OAM module 324, initiates a radio resource request illustrated at step 10, in which SP 314 delivers a message to an RF resource manager 320, requesting that an RF channel be assigned. As illustrated at step 11, RF resource manager 320 responds by accepting and processing the request from SP 314 and returning a radio resource request response that may assign a particular RF channel.

Upon receipt of an RF frequency assignment from RF resource manager 320, SP 314 responds, as illustrated at step 12 by delivering an assignment request to a switch 312. switch 312 may be located onboard a satellite or may be located within a terrestrial mobile switching center that operates within a wireless telecommunications system. Switch 312, as depicted at step 13, responds to the assignment request by commencing a Connection Admission Control (CAC) operation which, in part, includes designating a routing determination for the communications link requested by the originator. Following the CAC operation, and, as depicted at step 14, switch 312 delivers its response to the request made by SP 314 in the form of a switch resource request response assignment. SP 314 accepts the switch resource request response as depicted at step 15 by processing the response and sending a channel assignment response that is equivalent to a registration response to RF equipment 318. This registration response is then relayed from RF equipment 318 to an air interface 322 as illustrated at step 16. Finally, as depicted at step 17 air interface 322 assigns a channel to SIT 302 thereby completing the session setup phase of the attempted communications links and permitting the originator to make its requested connection.

Turning now to FIG. 4, a flow diagram 400 is depicted, which illustrates a simplified series of steps utilized to perform session processing in accordance with the teachings of the present invention. At step 402 a connection request is depicted which is a combined equivalent of step 1 of FIG. 3 in which a connection request is originated from SIT 302 and terminates at SP 314 which initially processes the request. Next, step 404 illustrates the access contention phase of the message processing flow depicted in FIG. 3. The access contention illustrated at step 404 is the direct equivalent of the access contention depicted at step 2 of FIG. 3 which occurs within SP 314. Next, step 406 depicts the charging validation stage of the message flow and includes the same series of steps as illustrated in steps 3 and 4 of FIG. 3.

A combined function labeled "authentication action" is depicted at step 408. Step 408 depicts the series of actions necessary to authenticate an originator as shown in steps 5 through 7 of FIG. 3. Next, step 410 illustrates the billing initiation stage of the attempted communications setup process. Step 410 includes and combines the charging action sent to OAM module 324 at step 8 of FIG. 3 and the charging response delivered from OAM module 324 to SP 314 at step 9. Time-slots are next assigned as depicted at step 412. The time-slot assignment step includes the RF resource request from SP 314 to RF resource manager 320 and the RF resource response from RF resource manager 320 to SP 314. Next, a switch assignment is made as illustrated at step 414. This switch assignment corresponds to the interaction between switch 312 and SP 314 as depicted in steps 12 through 14 in FIG. 3. Finally, a response message is delivered from SP 314 through RF equipment 318 and air interface 322 to the originator, which in FIG. 3 is depicted as SIT 302.

What is claimed is:

1. A method for utilizing a session processor to coordinate communication sessions within a network that includes a plurality of control interfaces, said method comprising:
   generating a session table that includes session control data which associates each of said plurality of control interfaces with each of a plurality of sessions, wherein said session control data comprises:
   a source and destination address;
   an authentication status; and
   a quality of service type;
   storing and updating a request identification tag within said session table, wherein said request identification tag correlates a message from one of said plurality of control interfaces to a message from said session processor;
   receiving a session control message from one of said plurality of control interfaces;
   processing said session control message;
   formulating a response message in accordance with said session control data as maintained within said session table;
   associating said request identification tag with said response message; and
   delivering said response message to at least one of said plurality of control interfaces such that said session processor maintains comprehensive and seamless control of network sessions.

2. The method of claim 1, wherein said step of processing said message further comprises:
   assigning a unique and unused request identification tag to a user session;
   updating said session table in accordance with assignments of request identification tags;
   storing counters for authentication attempts for a user address and said identification tags;

incrementing said counters for said authentication attempts for said user address and said identification tags; and clearing said counters for said authentication attempts for said user address and said identification tags.

3. The method of claim 1, wherein said step of processing said session control message farther comprises:

performing digit translation that converts a physical address into a network address; and generating internal records that describe said session processor and said device characteristics.

4. The method of claim 1, further comprising updating said session table in response to processing said session control message.

5. The method of claim 1, wherein said method further comprises:

for each session, storing within said session table:
a billing status; and
an activity status.

6. The method of claim 1, wherein said quality of service type maybe categorized as constant bit rate or variable bit rate.

7. The method of claim 1, further comprising storing data that specifies messages for which no response has been received in an outstanding message table.

8. The method of claim 7, further comprising indexing said outstanding message table utilizing said request identification tags.

9. A session processor for controlling communications in a wireless and satellite network, the session processor comprising:

processing means for generating a session table that includes session control data which associates an OAM interface, RF equipment interface, RF resource management interface, session admission control interface, session switching system interface, authentication interface, subscriber profile management interface, and fast message services interface with each of a plurality of sessions, wherein said session control data comprises:
a source and destination address;
an authentication status; and
a quality of service type;

processing means for storing and updating a request identification tag within said session table, wherein said request identification tag correlates a message from one of said plurality of control interfaces to a message from said session processor;

interfaces able to receive and transmit messages between said OAM interface, RF equipment interface, RF resource management interface, session admission control interface, session switching system interface, authentication interface, subscriber profile management interface, and fast message services interface;

databases that store tables, messages, internal records, and counters;

a processor for performing session processing;

memory for temporary storage of said tables, messages, internal records, and counters; and a clock for generating time stamps.

10. The session processor of claim 9, wherein said OAM interface:

receives operation, administration, and maintenance requests from said session processor; and transmits said operation administration, and maintenance request results to said session processor.

11. The session processor of claim 9, wherein said RF equipment interface:

receives wireless messages;

gathers quality metrics and quality guarantee values;

converts said wireless messages into a format said session processor can understand; and transmits said converted wireless messages to said session processor and to a network.

12. The session processor of claim 9, wherein said session admission control interface:

receives a session request to be accepted by session switching hardware from said session processor;

transmits a session response to said session processor; and gathers quality metric and quality guarantee values.

13. The session processor of claim 9, wherein said session switching system interface:

receives said messages from said session processor; and transmits said messages to said session processor.

14. The session processor of claim 9, wherein said authentication interface:

receives user authentication requests from said session processor; and transmits said user authentication responses to said session processor.

15. The session processor of claim 9, wherein said subscriber profile management interface:

receives subscriber information requests from said session processor; and transmits said subscriber information responses to said session processor.

16. The session processor of claim 9, wherein said fast message services interface:

receives channel assignment requests from said session processor; and transmits said channel assignment responses to said session processor.

17. The session processor of claim 9, wherein said RF resource management interface:

receives subscriber information requests from said session processor; and transmits said subscriber information responses to said session processor.

18. A system for utilizing a session processor to coordinate communication sessions within a network that includes a plurality of control interfaces, said system comprising:

means for generating a session table that includes session control data which associates each of said plurality of control interfaces with each of a plurality of sessions, wherein said session control data comprises:
a source and destination address;
an authentication status; and
a quality of service type;

means for storing and updating a request identification tag within said session table, wherein said request identification tag correlates a message from one of said plurality of control interfaces to a message from said session processor;

means for receiving a session control message from one of said plurality of control interfaces;

means for processing said session control message;

means for formulating a response message in accordance with said session control data as maintained within said session table;

means for associating said request identification tag with said response message; and means for delivering said response message to at least one of said plurality of control interfaces such that said session processor maintains comprehensive and seamless control of network sessions.

19. The system of claim 18, wherein said means for processing said message further comprises:

means for assigning a unique and unused request identification tag to a user session;

means for updating said session table in accordance with assignments of request identification tags;

means for storing counters for authentication attempts for a user address and said identification tags;

means for incrementing said counters for said authentication attempts for said user address and said identification tags; and means for clearing said counters for said authentication attempts for said user address and said identification tags.

20. The system of claim 18, wherein said means for processing said session control message further comprises:

means for performing digit translation that converts a physical address into a network address; and means for generating internal records that describe said session processor and said device characteristics.

21. A computer program product stored in signal bearing media for utilizing a session processor to coordinate communication sessions within a network that includes a plurality of control interfaces, said computer program product comprising:

instruction means stored in signal bearing media for generating a session table that includes session control data which associates each of said plurality of control interfaces with each of a plurality of sessions, wherein said session control data comprises:

a source and destination address;

an authentication status; and a quality of service type;

instruction means stored in signal bearing media for storing and updating a request identification tag within said session table, wherein said request identification tag correlates a message from one of said plurality of control interfaces to a message from said session processor;

instruction means stored in signal bearing media for receiving a session control message from one of said plurality of control interfaces;

instruction means stored in signal bearing media for processing said session control message; instruction means stored in signal bearing media for formulating a response message in accordance with said session control data as maintained within said session table;

instruction means stored in signal bearing media for associating said request identification tag with said response message; and instruction means stored in signal bearing media for delivering said response message to at least one of said plurality of control interfaces such that said session processor maintains comprehensive and seamless control of network sessions.

22. The computer program product of claim 21, wherein said instruction means stored in signal bearing media for processing said message further comprises:

instruction means stored in signal bearing media for assigning a unique and unused request identification tag to a user session;

instruction means stored in signal bearing media for updating said session table in accordance with assignments of request identification tags;

instruction means stored in signal bearing media for storing counters for authentication attempts for a user address and said identification tags;

instruction means stored in signal bearing media for incrementing said counters for said authentication attempts for said user address and said identification tags; and instruction means stored in signal bearing media for clearing said counters for said authentication attempts for said user address and said identification tags.

23. The computer program product of claim 21, wherein said instruction means stored in signal bearing media for processing said session control message further comprises:

instruction means stored in signal bearing media for performing digit translation that converts a physical address into a network address; and instruction means stored in signal bearing media for generating internal records that describe said session processor and said device characteristics.

* * * * *

UNITED STATES PATENT AND TRADEMARK OFFICE
CERTIFICATE OF CORRECTION

PATENT NO.   : 6,317,584 B1
DATED        : November 13, 2001
INVENTOR(S)  : Abu-amara et al.

It is certified that error appears in the above-identified patent and that said Letters Patent is hereby corrected as shown below:

<u>Title page,</u>
Item [75], add the word -- Ph.D. -- behind the name "Robert Best."

<u>Column 6,</u>
Line 33, add the word -- With -- before the word "reference."

Signed and Sealed this

Thirteenth Day of August, 2002

Attest:

Attesting Officer

JAMES E. ROGAN
Director of the United States Patent and Trademark Office